Patented Apr. 25, 1939

2,155,721

UNITED STATES PATENT OFFICE 2,155,721

GLASS-MAKING MATERIAL

Harley C. Lee, Columbus, Ohio, assignor, by mesne assignments, to Society for Savings in the City of Cleveland, Cleveland, Ohio, a corporation of Ohio No Drawing. Application August 1, 1936, Serial No. 93,882

9 Claims. (Cl. 106—36.1)

In compounding glass batches the essential components of which are glass sand, soda ash, and lime, along with other ingredients as, for instance, cullet, saltcake, carbon, feldspar, etc., as dictated by the particular practice and composition of the glass desired, it is common practice to add the lime component either in the form of limestone or as calcined lime. In many cases it is desirable to incorporate magnesia in the glass, and magnesian limestones or dolomite or their respective limes are often substituted for all or part of the limestone or lime to give the desired magnesia content in the glass. Often it is more economical to add the lime component in the form of lime rather than as limestone or dolomite because of the increased cost of transporting limestone and of driving off the carbon dioxide in the batch, and in general lime would be used much more were it not for the difficulties encountered in its handling and use. Ordinarily very pure limestones or dolomites are required for glass making and when such limestones or dolomites are calcined a porous, friable lime is formed. This calcined product is ordinarily crushed before mixing with the other constituents of the batch. In the crushing, transportation, and handling of this friable lime, much dust is continually formed. This caustic lime dust is very irritating to the workmen and is continually carried out of the batch by the furnace gases into the regenerative system with consequent loss of lime, variation in the batch, and damage to the furnace. The calcined or burnt lime rapidly absorbs moisture and carbon dioxide from the atmosphere, making it difficult to control the composition of the batch and further increasing the amount of objectionable dust. The porous calcined material is much lighter in weight than the glass sand and segregation occurs which makes it difficult to attain uniform melting of the batch. Further, the high porosity of the lime introduces the possibility of "seeds" from the microscopic gas bubbles in the porous lime and in general it is difficult to quickly and uniformly incorporate such lime into the glass. I have found however that glass furnace charges can be prepared without the difficulties noted and in a manner conducive to ease of handling and uniformity of result, and by modifying the physical characteristics and the nature of the lime constituent, particularly advantageous results are had, making possible more rapid solution of the lime and easier vitrification of the batch.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

In the preparation of glass furnace charges in accordance with the invention, in addition to the glass sand, soda ash, and accessory constituents such as cullet, saltcake, feldspar, carbon, etc., which the practice and composition of glass demands, lime is provided along with boron in a dense form which minimizes segregation in the batch, and also has improved stability towards atmospheric deterioration, thus facilitating and insuring greater uniformity in the batch.

For the preparation of the lime component, there is employed limestone of high calcium content, or limestone containing more or less magnesia and which for convenience may be designated dolomite irrespective of whether the magnesium runs near molecular proportions to the calcium or is much less. The limestone or dolomite is suitably crushed preparatory to calcination. The extent of the crushing of the raw stone will depend somewhat upon the method of calcination and the character of the stone. With the stone crushed to the size desired, there is supplied a small amount of a boron providing material as a mineralizing agent and the stone is calcined to about 2400° F., or above, along with the mineralizing agent. As a boron providing material, I may employ boric acid, borax, razorite, colemanite, pandermite, ulexite, etc., or any material which is a convenient source of available boron oxide. These should contain little or no iron oxide. The amount of mineralizing agent required to make a suitable lime component for the glass batch is small, and in terms of $B_2O_3$ in the raw stone, may vary from about 0.1 per cent to about 1.0 per cent or more. The keeping qualities are improved by the larger amounts of boron material. The amount of boron material used will vary some with the source of boron, more being ordinarily required with the sodium borates than with boric acid or calcium borates. High calcium limestone likewise require slightly more boron material than dolomitic limestones to impart the same relative keeping qualities.

The limestones or dolomites can advantageously be very pure, or if desired those containing considerable silica and alumina may be used. Limestones or dolomites containing very little iron are preferable for most glass-making practices. If desired, the limestone or dolomite may be ground finely, for example to 65 mesh or finer. The boron material may be intimately mixed with the stone either in a finely ground condition or where soluble boron compounds are used, they may be added as a solution. Marl or precipitated calcium carbonate may be used in lieu of limestone. The mixture of stone and boron material is then fired to about 2400° F., or above. Or, the stone may be crushed to pass about a ⅜ inch slot, or may be sized within this range, as for example from about minus 6 mesh to about 40 mesh, and the boron material mixed with the stone in finely divided or solution form, the boron material preferably coating or covering the stone particles. The stone and boron material are calcined at a temperature of about 2500° F. or above, as for example, on a sintering machine or in a rotary kiln. Where the particles are agitated during the burning operation as in a rotary kiln, the boron material can conveniently be added in a somewhat coarser form.

Again, lumps of limestone or dolomite may be treated with borates or boric acid and calcined at a temperature of 2500° F. or above with considerable improvement in the keeping qualities of the resulting lime. For instance, porous limestones and dolomites in the form of lumps of from one-inch to four inches or more in size, can be treated with aqueous solutions of borates or boric acid and calcined in shaft or periodic kilns at a temperature of 2500° F.

The size of the stone can thus be varied from coarse lumps on the one extreme to finely ground stone on the other extreme, the greatest improvement being attained using stone of small particle size or finely ground stone.

The temperatures employed will usually fall within the range of about 2400° F. to about 2900° F. The temperature will depend upon the type of kiln, upon the size of stone, upon the amount of boron providing material used, and upon the density and degree of improvement desired in the lime for the particular glass batch. In general, with a given stone, longer heating, larger amounts of boron providing materials, and small sizes of stone all permit of lower firing temperatures.

The product, if of suitable size (for example, about 10 mesh or finer) is directly available for use in compounding glass batches or the coarser product may be broken down such that all will pass a mesh of convenient size, for instance 10 or 20 mesh. The product suitably sized is mixed with glass sand and soda ash in proportion to give the desired composition in the glass, and accessory constituents such as cullet, saltcake, feldspar, etc. being added as desired. The specially prepared lime product may be used as the sole source of the lime in the batch, or part of the lime requirements may be supplied from another source as the practice and the composition of the glass may demand. To better conform with variations in practice and in the composition of the glass, the lime requirements of the batch may be met by supplying both a high calcium lime made according to this invention, and a specially prepared dolomitic lime, made according to this invention suitably compounding these two limes with the other constituents of the batch to conform with the desired composition of the glass.

Calcining the limestone or dolomite with a small amount of boron oxide materials as described, brings about a combination of the boron materials with the lime which tends to mineralize the product, induces shrinkage and hardness in the product, and converts the uncombined CaO in the lime into crystalline CaO. Such lime can be provided, having a bulk density of 100 pounds per cubic foot or more, and containing upwards of 98 per cent or more of calcium and magnesium oxides with little loss on ignition. With the materials selected to be particularly low in iron, the lime may be prepared low in iron content, for instance, less than 0.2 per cent or even less than 0.1 per cent.

As an example: Dolomite containing 0.3 per cent $SiO_2$, 0.1 per cent $Al_2O_3$, and .05 per cent $Fe_2O_3$, is sized to pass a 6 mesh opening, particles finer than 30 mesh being eliminated. With this raw stone is incorporated 0.4 per cent granular boric acid and the mixture is fed into a rotary kiln and fired to 2750° F. The grains are in the same general form in which they entered the kiln, and are well shrunken, hard, and dense, with a somewhat vitreous or glazed appearing surface. The lime is crushed to pass about a 16 mesh screen. The product is stored and later mixed with silica sand, soda ash, and accessory constituents of the glass batch in the desired proportions. One such batch for instance would comprise sand 1000 parts by weight, soda ash 375 parts, and the treated lime 120 parts.

As another example: Limestone containing 0.6 per cent $SiO_2$, 0.2 per cent $Al_2O_3$, about 1.0 per cent MgO, and .04 per cent $Fe_2O_3$, is crushed to pass about a $\frac{3}{16}$ inch screen and the dust removed. With this raw stone is incorporated about 0.5 per cent of boric acid and the mixture is burned in a rotary kiln at approximately 2750° F. The hard, dense, well shrunken lime possesses good keeping qualities and after crushing to pass about a 16 mesh screen, can be stored under the same conditions much longer than ordinary lime. The sized product is taken from storage and mixed with soda ash, sand, feldspar, cullet, and accessory constituents of the glass batch in the desired proportions to conform to the composition desired in the glass. One batch for instance would comprise silica sand 1000 parts, soda ash 350 parts, treated lime of this example 90 parts, dolomitic lime from the previous example 15 parts, and cullet.

As another example: A relatively pure dolomite containing .04 per cent iron oxide is ground with 0.5 per cent of rasorite containing about 45 per cent of $B_2O_3$. The mixture is then heated in a periodic kiln to cone 16. The material consolidates and shows evidence of considerable shrinkage. The product is broken up to pass about a 16 mesh screen. The uncombined lime has been converted into crystalline CaO, and the product can be stored with reasonable care for comparatively long periods. The crushed lime is then mixed with soda ash, cullet, and sand into a glass batch along with accessory constituents proportioned to provide a glass of desired composition.

As another example: A limestone containing less than one per cent of silica, less than 0.1 per cent iron oxide, and about one per cent of magnesia, is ground to 65 mesh, along with 1 per cent of colemanite containing about 35 per cent or more of $B_2O_3$, and the mixture is fired at a temperature of about 2600° F. The uncombined lime is converted into crystalline CaO by the firing operation. The crushed lime is mixed with soda, silica sand, cullet, and accessory constituents such as feldspar, saltcake, and carbon, in proportions to form a glass batch of the desired composition.

A glass batch involving lime made by the last two examples could be for instance, silica sand 1000 parts, dolomitic lime made according to the previous example 150 parts, lime made according to the last example 30 parts, soda ash 280 parts, saltcake 50 parts, carbon 2 parts.

Other modes of applying the principle of the invention may be employed, change being made as regards the details described, provided the features stated in any of the following claims, or the equivalent of such, be employed.

I therefore particularly point out and distinctly claim as my invention:

1. A glass-making material, which comprises silica, soda, and a lime component which is limestone calcined and superficially reacted in the calcining heat with one-tenth to one per cent of available boron oxide.

2. A glass-making material, which comprises silica, soda, and a lime component which is dolomite calcined and superficially reacted in the calcining heat with one-tenth to one per cent of available boron oxide.

3. A glass-making material, which comprises silica, soda, and a lime component which is pieces of limestone calcined and surface-coated in the calcining heat by reaction products with available boron.

4. A glass-making material, which comprises silica, soda, and a lime component which is pieces of dolomite calcined and surface-coated in the calcining heat by reaction products with available boron.

5. A process of preparing a glass-making material, which comprises driving off carbon dioxide from a limestone, by heat and simultaneously superficially reacting with one-tenth to one per cent of available boron oxide, and mixing with sand and soda.

6. A process of preparing a glass-making material, which comprises driving off carbon dioxide from dolomite and simultaneously superficially reacting with one-tenth to one per cent of available boron oxide, and mixing with sand and soda.

7. A process of preparing a glass-making material, which comprises driving off carbon dioxide from a limestone and simultaneously reacting with available boron in small amount to combine with merely a minor portion of the lime, and mixing with sand and soda.

8. A process of preparing a glass-making material, which comprises driving off carbon dioxide from dolomite and simultaneously reacting with available boron in small amount to combine with merely a minor portion of the lime, and mixing with sand and soda.

9. A process of making a glass furnace charge which comprises driving off carbon dioxide from a limestone and simultaneously reacting with available boron in amount much less than sufficient to combine with all the lime, and then mixing the product with other glass making materials.

HARLEY C. LEE.